United States Patent
Haseltine et al.

(10) Patent No.: US 10,732,432 B2
(45) Date of Patent: Aug. 4, 2020

(54) FLOATING IMAGE DISPLAY SYSTEM

(71) Applicant: Disney Enterprises, Inc., Burbank, CA (US)

(72) Inventors: Eric C. Haseltine, Burbank, CA (US); Michael P. Goslin, Sherman Oaks, CA (US); Stephen A. Thornton, Redondo Beach, CA (US); Jonathan R. Hsu, Pomona, CA (US); Elliott Baumbach, Porter Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/458,774

(22) Filed: Jul. 1, 2019

(65) Prior Publication Data

US 2019/0324284 A1 Oct. 24, 2019

Related U.S. Application Data

(63) Continuation of application No. 15/888,896, filed on Feb. 5, 2018.

(51) Int. Cl.
*G02B 30/56* (2020.01)
*G09G 3/00* (2006.01)
(Continued)

(52) U.S. Cl.
CPC .............. *G02B 30/56* (2020.01); *G06T 1/20* (2013.01); *G09G 3/003* (2013.01); *G09G 3/005* (2013.01);
(Continued)

(58) Field of Classification Search
CPC ...... G02B 2027/0138; G02B 2027/014; G02B 2027/0187; G02B 27/017; G02B 13/06;
(Continued)

(56) References Cited

U.S. PATENT DOCUMENTS

| | | | |
|---|---|---|---|
| 4,687,167 A | 8/1987 | Skalka | |
| 5,437,235 A | 8/1995 | Randolph | |

(Continued)

FOREIGN PATENT DOCUMENTS

| | | |
|---|---|---|
| JP | S58-154913 U | 10/1983 |
| JP | H1-280992 A | 11/1989 |

(Continued)

OTHER PUBLICATIONS

Yasuhiro Suzuk, et al. "Research of Real World Life-Sized Video Avatar Presentation System," *Proceedings of the Virtual Reality Society of Japan Annual Conference 10*, Sep. 29, 2005, pp. 111-114.

(Continued)

*Primary Examiner* — Ming Wu
(74) *Attorney, Agent, or Firm* — Farjami & Farjami LLP

(57) ABSTRACT

According to one implementation, a floating image display system includes a computing platform including a central processing unit (CPU), a graphics processing unit (GPU), and a system memory storing a software code. The system also includes one or more display screens controlled by the GPU, and a rotor coupled to the one or more display screens and controlled by the CPU. The CPU executes the software code to render a two-dimensional (2D) graphic on the one or more display screens using the GPU, and to spin the rotor and the one or more display screens about a vertical axis parallel to a display surface of the one or more display screens at a predetermined spin rate to generate a floating image of the 2D graphic. The floating image appears to be a three-dimensional (3D) floating image of the 2D graphic to a user viewing the floating image.

16 Claims, 9 Drawing Sheets

(51) Int. Cl.
*G06T 1/20* (2006.01)
*G09G 3/34* (2006.01)
*G09G 3/36* (2006.01)

(52) U.S. Cl.
CPC .............. *G09G 3/3406* (2013.01); *G09G 3/36* (2013.01); *G09G 2320/0626* (2013.01); *G09G 2354/00* (2013.01); *G09G 2358/00* (2013.01)

(58) Field of Classification Search
CPC ............ G02B 15/10; G02B 2027/0198; G02B 27/0172; G02B 27/2292; H04N 13/344; H04N 13/117; H04N 13/15; H04N 13/161; H04N 13/167; H04N 13/178; H04N 13/189; H04N 13/194; H04N 13/239; H04N 13/243; H04N 13/246; H04N 13/257; H04N 13/279; H04N 13/289; H04N 13/296; H04N 13/373; H04N 13/376; H04N 13/38; H04N 13/383; H04N 13/398; H04N 19/27; H04N 19/597; H04N 2013/0081; H04N 2013/0096; H04N 5/2259; H04N 5/23203; H04N 5/23238; H04N 5/247; H04N 5/335; H04N 7/002; H04N 7/144; H04N 7/18; H04N 7/185
See application file for complete search history.

(56) References Cited

U.S. PATENT DOCUMENTS

| | | | | |
|---|---|---|---|---|
| 5,714,997 | A * | 2/1998 | Anderson | G02B 27/017 348/39 |
| 6,208,318 | B1 * | 3/2001 | Anderson | H04N 13/398 345/1.1 |
| 6,481,851 | B1 * | 11/2002 | McNelley | G02B 30/56 353/28 |
| 8,704,822 | B2 * | 4/2014 | Butler | G02B 30/56 345/419 |
| 2003/0142067 | A1 | 7/2003 | Kurtenbach et al. | |
| 2004/0082283 | A1 | 4/2004 | Lindell | |
| 2004/0196362 | A1 | 10/2004 | Hoshino et al. | |
| 2005/0284997 | A1 | 12/2005 | Tisbo | |
| 2009/0312979 | A1 * | 12/2009 | Pan | G01R 31/343 702/115 |
| 2010/0007582 | A1 | 1/2010 | Zalewski | |
| 2011/0110531 | A1 * | 5/2011 | Klefenz | G01S 3/809 381/92 |
| 2012/0293941 | A1 | 11/2012 | Myerchin | |
| 2014/0307068 | A1 | 10/2014 | Song et al. | |
| 2017/0038829 | A1 | 2/2017 | Lanier et al. | |

FOREIGN PATENT DOCUMENTS

| | | |
|---|---|---|
| JP | H9-238369 A | 9/1997 |
| JP | 2004-54150 A | 2/2004 |
| JP | 2005-221946 A | 8/2005 |
| JP | 2005-275398 A | 9/2005 |
| JP | 2010-273013 A | 12/2010 |

OTHER PUBLICATIONS

Hikechi Maeda, et al. "Experimental Development and Evaluation of All-Around Display System for Video Avatar in the Real World," *Proceedings of the Virtual Reality Society of Japan Annual Conference 8*, Sep. 3, 2003.

* cited by examiner

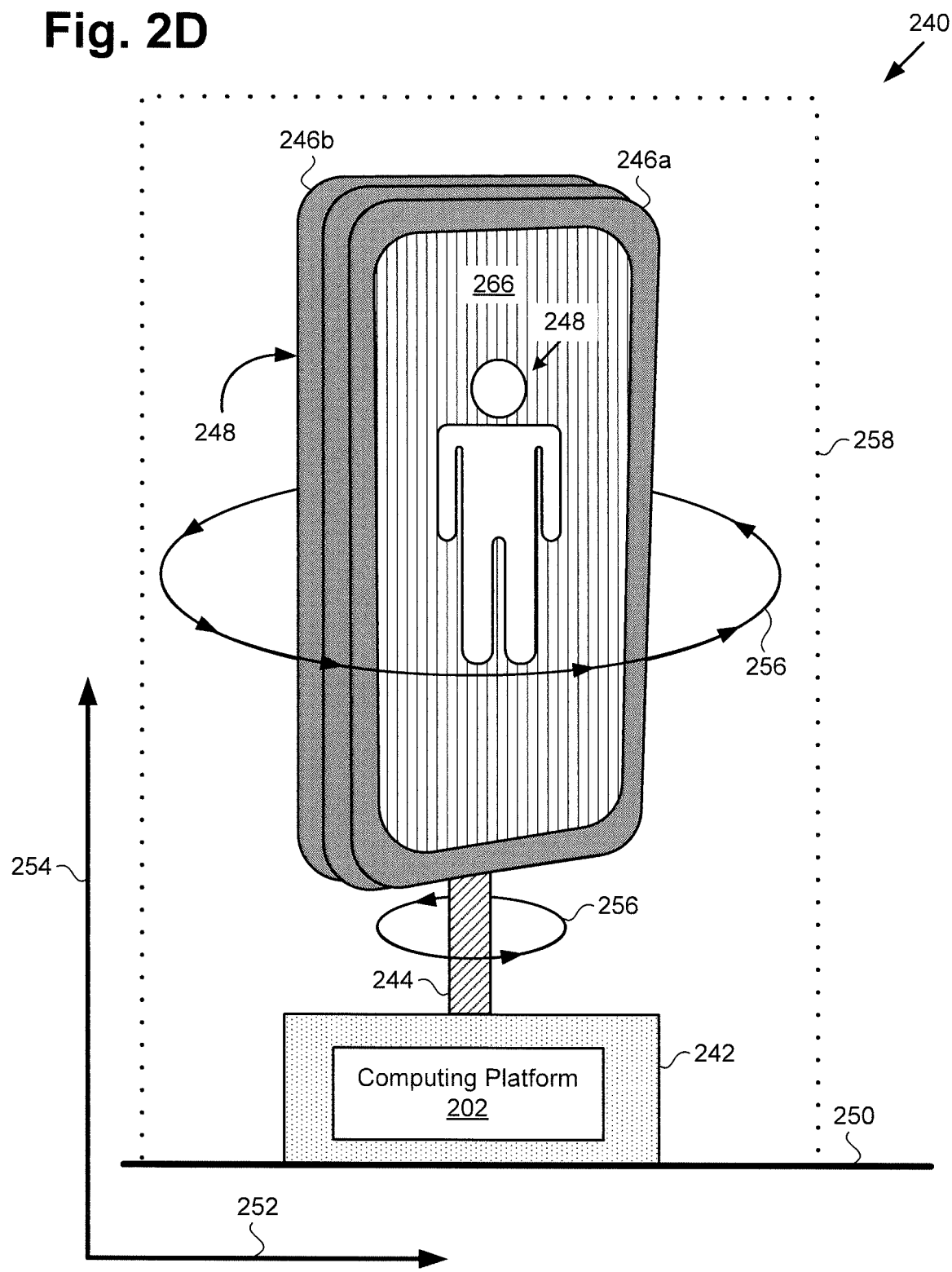

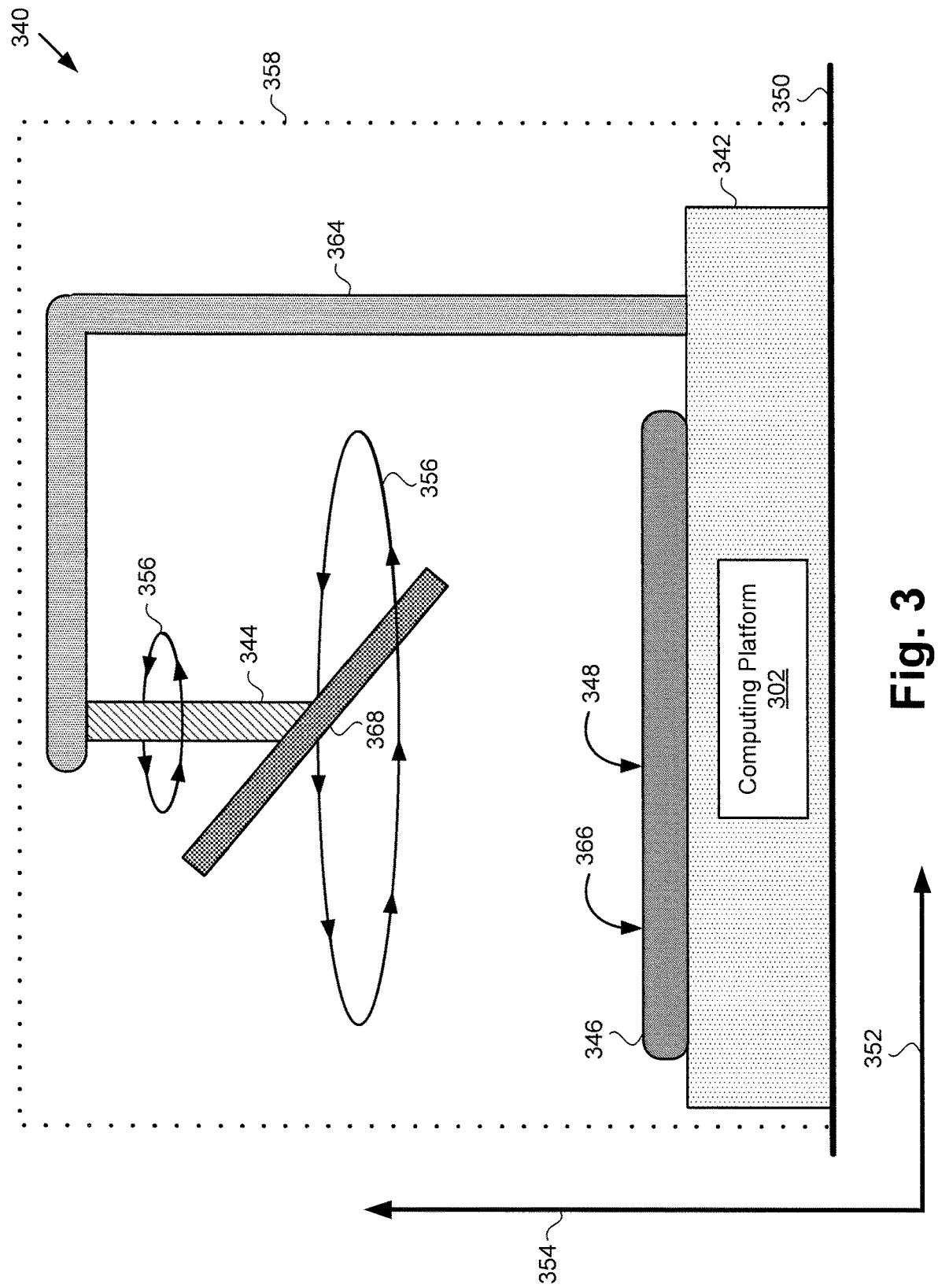

FLOATING IMAGE DISPLAY SYSTEM

The present application is a Continuation of U.S. application Ser. No. 15/888,896, filed Feb. 5, 2018, which is hereby incorporated by reference in its entirety into the present application.

BACKGROUND

Advances in computer technology and software have made possible the creation of richly featured virtual characters capable of simulating interactivity with a human viewer of the virtual character. The illusion of interactivity can be further enhanced when the virtual character is displayed as a three-dimensional (3D) image, apparently independent of the display system generating it. For example, the image of the virtual character may be shown as a holographic image, or may be shown as an image that appears to float in space.

Conventional techniques for displaying holographic or floating images typically utilize sophisticated optical arrays to project the image for viewing, which can limit the environments and use cases in which providing such interactive 3D imagery is practical. Consequently, in order to make the enhanced entertainment value of interaction with a holographic or floating image more widely available, there is a need in the art for an imaging solution capable of displaying a floating image of a virtual character using readily available consumer electronics or relatively simple optical arrays.

SUMMARY

There are provided floating image display systems, substantially as shown in and/or described in connection with at least one of the figures, and as set forth more completely in the claims.

BRIEF DESCRIPTION OF THE DRAWINGS

FIG. 2D shows a diagram of an exemplary floating image generator integrated with a computing platform, according to another implementation;

FIG. 3 shows a diagram of an exemplary floating image generator integrated with a computing platform, according to yet another implementation;

DETAILED DESCRIPTION

Figure 1A:
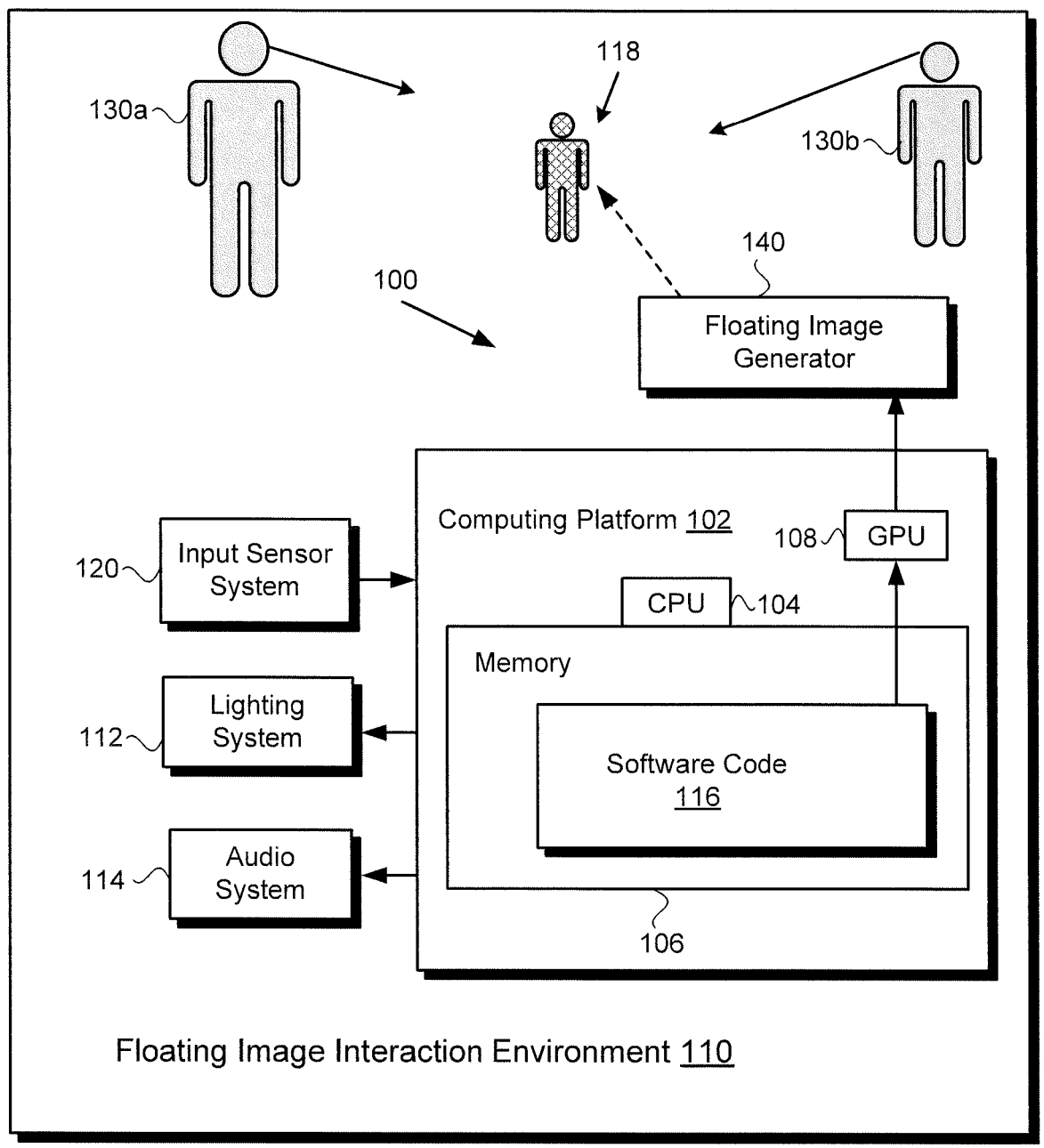
FIG. 1A shows a diagram of an exemplary floating image display system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses floating image display systems that overcome the drawbacks and deficiencies in the conventional art. In some implementations, one or more display screens upon which a two-dimensional (2D) graphic is rendered is/are spun to generate a floating image that appears to be three-dimensional (3D). In an alternative implementation, the 2D graphic is rendered on a display screen and a mirror facing the display screen at an angle is spun to generate the apparently 3D floating image. In yet other implementations, a relatively simple array of optical elements can be utilized to project a 2D graphic as a floating image. Consequently, the display solutions disclosed in the present application advantageously make possible and practical the display of apparently 3D floating images in a wide variety of use cases and implementational environments.

FIG. 1A shows a diagram of exemplary floating image display system 100, according to one implementation. As shown in FIG. 1A, floating image display system 100 includes computing platform 102 interactively linked to lighting system 112, audio system 114, input sensor system 120, and floating image generator 140. As further shown in FIG. 1A, computing platform 102 has central processing unit (CPU) 104, implemented as a hardware processor, system memory 106 implemented as a non-transitory storage device storing software code 116, and graphics processing unit (GPU) 108. Also shown in FIG. 1A are floating image 118 displayed by floating image display system 100, viewers 130a and 130b of floating image 118 (also herein "users 130a and 130b"), and floating image interaction environment 110 in which floating image display system 100 is implemented.

It is noted that although FIG. 1A shows two users 130a and 130b, that representation is provided merely for conceptual clarity. More generally, users 130a and 130b may correspond to a single user, or to more or many more than two users who may be positioned so as to view floating image 118 from a variety of perspectives. For example, in some implementations, users 130a and 130b may be situated so as to view floating image 118 from a number of discrete perspectives, such as three discrete perspectives located approximately 120° apart on an imaginary 360° circle surrounding floating image 118 in floating image interaction environment 110. However, in other implementations, users 130a and 130b may be able to view floating image 118 from the perspective of any position on such an imaginary circle surrounding floating image 118.

In some implementations, one or more of users 130a and 130b may be interactively engaged with floating image 118 via floating image display system 100 including computing platform 102, lighting system 112, audio system 114, input sensor system 120, and floating image generator 140. That is to say, in those implementations, CPU of computing platform 102 may be configured to execute software code 116 to utilize lighting system 112, audio system 114, input sensor system 120, GPU 108, and floating image generator 140 to create and/or maintain the illusion that floating image 118 is responsive to one or more of users 130a and 130b. For example, floating image 118 may appear to respond to one or more of the speech, appearance, posture, location, or movements of one or more of users 130a and 130b in floating image interaction environment 110.

It is further noted that although FIG. 1A depicts lighting system 112, audio system 114, input sensor system 120, and floating image generator 140 as communicatively coupled to, but not structurally integrated with, computing platform 102, that representation is merely exemplary. In other implementations, one, more than one, or all of lighting system 112, audio system 114, input sensor system 120, and floating image generator 140 may be structurally integrated with computing platform 102. Thus, in various implementations, computing platform 102 can include one or more of lighting system 112, audio system 114, input sensor system 120, and floating image generator 140, in addition to CPU 104, system memory 106 storing software code 116, and GPU 108.

Lighting system 112 may include lighting elements that are wholly integrated with computing platform 102, may include lighting elements that are controlled by but remote from computing platform 102, such as lighting elements mounted on or adjacent to a ceiling, walls, or floor of floating image interaction environment 110, or may be partially integrated with computing platform 102 while including remote lighting elements. Lighting system 112 may include multiple light sources, and may be configured to provide light of varying intensity and varying colors, for example. For instance, lighting system 112 may include small spotlights configured to provide directional lighting that can be turned on or off, or be selectively dimmed and to brightened.

Similarly, audio system 114 may be wholly integrated with computing platform 102, may include elements, such as audio speakers, that are controlled by but remote from computing platform 102, such as elements mounted on or adjacent to a ceiling, walls, or floor of floating image interaction environment 110, or may be partially integrated with computing platform 102 while including remote audio elements. In one implementation, audio system 114 may be a venue wide audio system, such as a theater quality Dolby® high definition (HD) surround-sound system, for example. Moreover, audio system 114 may include a library of stored audio recordings that can be played back through audio system 114.

In some implementations, lighting system 112 and audio system 114 may be synchronized with floating image generator 140 and the output of GPU 108 to produce an immersive multi-media experience within floating image interaction environment 110. It is noted that input sensor system 120 is described in greater detail below by reference to FIG. 1B, while various implementations of floating image generator 140 are described below by reference to FIGS. 2A, 2B, 2C, 2D, 3, 4, and 5.

Floating image interaction environment 110 can correspond to a variety of leisure, entertainment, or educational venues, for example. Examples of such venues include a theme park, a shopping mall, a hotel, a casino, a hospital, or a museum, to name a few. Alternatively, floating image interaction environment 110 may correspond to a teleconferencing venue in an office complex, hospital, university, or hotel business center, for example. In implementations in which floating image interaction environment 110 is a teleconferencing venue, for example, users 130a and 130b may correspond to local participants in a teleconference, while floating image 118 may provide an interactive, apparently 3D image of one or more remote participants in the teleconference.

Figure 1B:
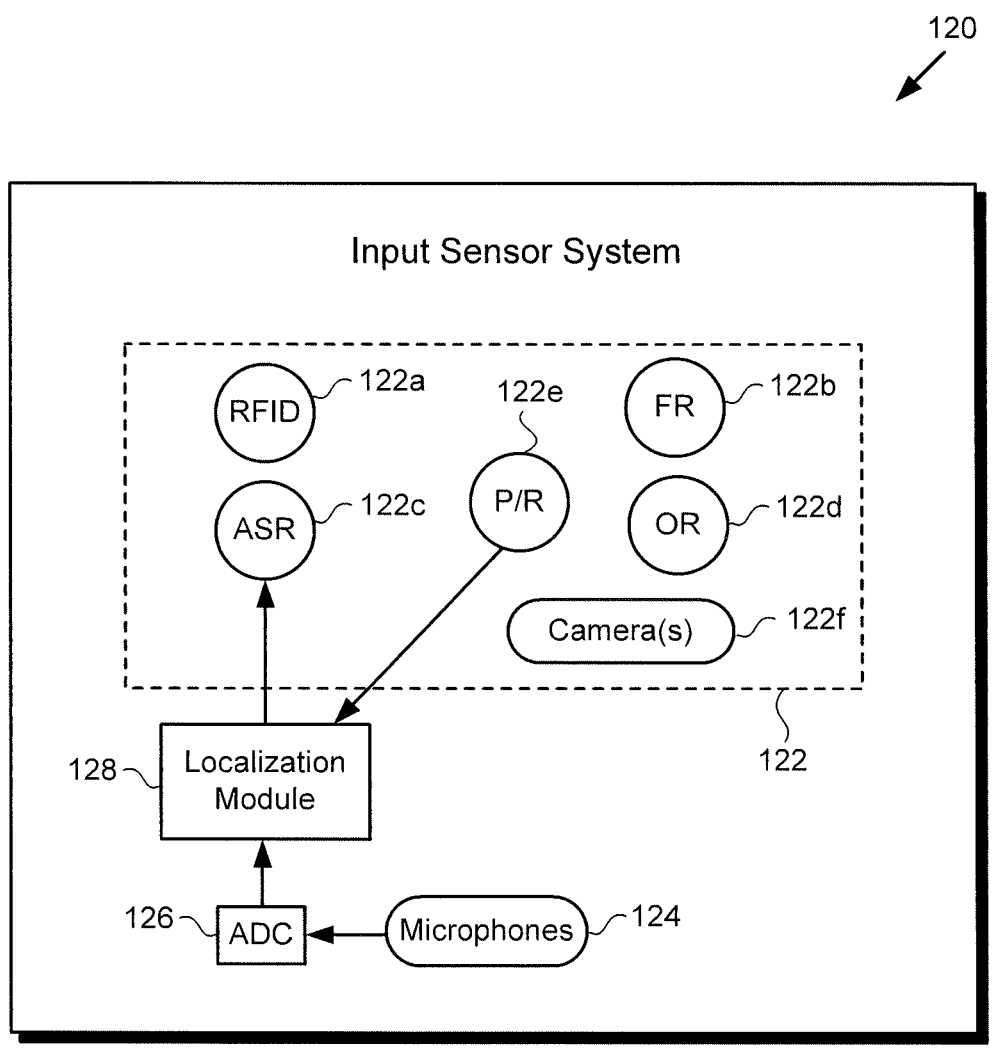
FIG. 1B shows a diagram of exemplary input sensors suitable for use as part of a floating image display system, according to one implementation.

FIG. 1B shows a more detailed exemplary implementation of input sensor system 120, in FIG. 1A. As shown in FIG. 1B, input sensor system 120 includes multiple sensors 122, microphones 124, analog-to-digital converter (ADC) 126, and localization module 128. As further shown in FIG. 1B, sensors 122 of input sensor system 120 may include radio-frequency identification (RFID) sensor 122a, facial recognition (FR) sensor 122b, automatic speech recognition (ASR) sensor 122c, object recognition (OR) sensor 122d, position and/or rate (P/R) sensor 122e, and one or more camera(s) 122f.

It is noted that the specific sensors shown to be included among sensors 122 of input sensor system 120 are merely exemplary, and in other implementations, sensors 122 of input sensor system 120 may include more, or fewer, sensors than RFID sensor 122a, FR sensor 122b, ASR sensor 122c, OR sensor 122d, P/R sensor 122e, and camera(s) 122f. RFID sensor 122a, FR sensor 122b, ASR sensor 122c, OR sensor 122d may be implemented using any suitable sensors for those respective functions, as known in the art. For example, P/R sensor 122e may be implemented as a Hall effect sensor, an optical encoder, or using a potentiometer or light-emitting diode (LED) and photo sensor.

One or more camera(s) 122f may include one or more still camera(s) and/or one or more video camera(s), for example. Microphones 124 may include stationary and/or moving microphones. For example, stationary microphones of microphones 124 may be distributed in a 360° array surrounding floating image 118 to enhance directional sensing of sound, such as speech, produced by one or more of users 130a and 130b.

In some implementations, one or more moving microphones of microphones 124 may rotate in synchronization with a rotor of floating image generator 140. In those implementations, P/R sensor 122e may be used in combination with microphones 124 to identify the direction from which a sound sensed using microphones 124 is received. Whether implemented as stationary, moving, or both, microphones 124 may be configured to include acoustic waveguides to further enhance their directional sensitivity.

As indicated in FIG. 1B, in some implementations, data from P/R sensor 122e and or data generated by ADC 126 from sounds detected by microphones 124 are processed by localization module 128 to identify the distance and/or direction of the respective sources of the sounds received by microphones 124. In those implementations, the output from localization module 128 may be provided to ASR sensor 122c to enhance the performance of ASR sensor 122c in discriminating among environmental sounds, noise, and purposeful speech by one or more of users 130a and 130b. As a result, the advantageous illusion of interactivity by floating image 118 can be further supported by the apparently appropriate acoustic and/or visual responsiveness of floating image 118 to the speech and/or actions of one or more of users 130a and 130b.

Figure 2A:
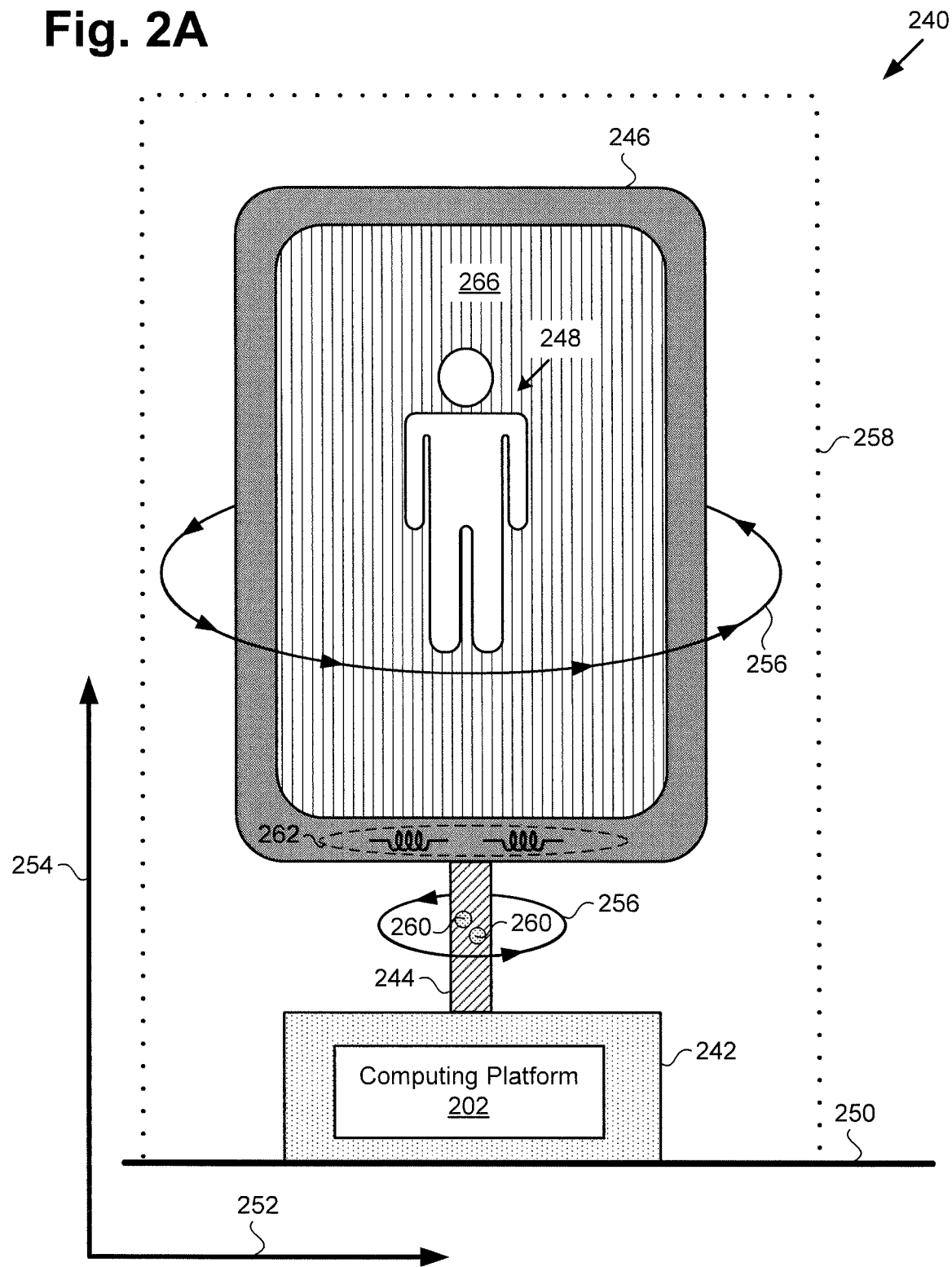
FIG. 2A shows a diagram of an exemplary floating image generator integrated with a computing platform, according to one implementation.

FIG. 2A shows a diagram of exemplary floating image generator 240 integrated with computing platform 202, according to one implementation. As shown in FIG. 2A, floating image generator 240 includes base 242 having integrated computing platform 202, situated on surface 250, which may be a floor within floating image interaction environment 110, or another horizontal surface within floating image interaction environment 110 substantially parallel to the floor.

In addition, floating image generator 240 includes rotor 244 including optional magnets 260, display screen 246 including optional one or more induction coils 262 and having optional privacy screen 266 affixed thereon, and may further include masking shutter 258 surrounding base 242, rotor 244, and display screen 246. Also shown in FIG. 2A are horizontal axis 252 substantially parallel to surface 250, vertical axis 254 substantially perpendicular to surface 250, spin direction 256 of rotor 244 and display screen 246, and 2D graphic 248 rendered on display screen 246.

Floating image generator 240 corresponds in general to floating image generator 140, in FIG. 1A, and those features may share any of the characteristics attributed to either corresponding feature by the present disclosure. In addition, computing platform 202 corresponds in general to computing platform 102, in FIG. 1A, and those features may share any of the characteristics attributed to either corresponding feature by the present disclosure. Thus, although not explicitly shown in FIG. 2A, computing platform 202 includes features corresponding respectively to to CPU 104, GPU 108, and system memory 106 storing software code 116. Moreover, like computing platform 102, computing platform 202 may be configured to control, or may have integrated therein, one or more of lighting system 112, audio system 114, and input sensor system 120.

Referring to FIGS. 1A and 2A in combination, according to the exemplary implementation shown in FIG. 2A, display screen 246 is controlled by GPU 108 of computing platform 102/202, while rotor 244 coupled to display screen 246 is controlled by CPU 104 of computing platform 102/202. CPU 104 of computing platform 102/202 is configured to execute software code 116 to render 2D graphic 248 on display screen 246 using GPU 108.

CPU 104 is further configured to execute software code 116 to spin rotor 244 and display screen 246 about vertical axis 254 parallel to a display surface of display screen 246 at a predetermined spin rate, which may be on the order of approximately one or more tens of rotations per second, such as approximately forty rotations per second for example, to generate floating image 118 of 2D graphic 248. As a result of the floating image generation performed by floating image generator 140/240, floating image 118 appears to be a 3D floating image of 2D graphic 248 to users 130a and 130b viewing floating image 118.

In some implementations, display screen 246 may be a liquid-crystal display (LCD) screen, for example. Moreover, in some implementations, display screen 246 may be provided by a mobile communication device included as part of floating image generator 140/240, coupled to rotor 244, and configured to spin with display screen 246 at the predetermined spin rate. For example, display screen 246 may be part of a smartphone or a tablet computer. It is noted that in implementations in which display screen 246 is part of a mobile communication device such as a smartphone or a tablet computer, one or more microphones 124 and sensors 122 including camera(s) 122f of input sensor system 120 may be features built into the is mobile communication device.

In the implementation shown in FIG. 2A, various features and/or techniques may be utilized to reduce flicker and/or blur of floating image 118 generated by floating image generator 140/240. For example, optional privacy screen 266 may be affixed to the display surface of display screen 246 so as to restrict viewing of display screen 246 outside of a predetermined viewing angle. Such a privacy screen may take the form of a louvered structure affixed to display screen 246, or to a privacy film covering the display surface of display screen 246.

Alternatively, or in addition, in implementations in which display screen 246 is an LCD screen, CPU 104 may be configured to execute software code 116 to strobe one or more of the frequency, intensity, and duty cycle of the LCD backlight at a predetermined strobe rate. Strobing can reduce motion blur by decreasing the time window over which the human eye and brain integrate visual information regarding spatial features. A privacy film restricts the viewing angles of display screen 246 and thereby restricts the number of spatially distinct images presented to the eye per unit of time.

Although, in some implementations, optional privacy screen 266 may be an to advantageous or desirable feature for reducing flicker and/or blur, in some other implementations it may be preferable to omit optional privacy screen 266. For example, in implementations in which true volumetric images, such as surfaces of revolution, are to be displayed as floating image 118, privacy screen may be preferentially omitted. As a specific example, where 2D graphic 248 is rendered on display screen 246 as a 2D circle, spinning of display screen 246 by floating image generator 240 will result in floating image 118 appearing to users 130a and 130b as a true 3D sphere. Analogously, where 2D graphic 248 is rendered on display screen 246 as a 2D triangle, spinning of display screen 246 by floating image generator 240 will result in floating image 118 appearing to users 130a and 130b as a 3D cone. It is noted that CPU 104 may execute software code 116 to spin rotor 244 and display screen 246 about vertical axis 254 at a varying spin rate, or at a substantially constant predetermined spin rate. It is also noted that spin direction 256 may be in either a counter clockwise direction with respect to the plane of horizontal axis 252, as shown in FIG. 2A, or in a clockwise direction with respect to that plane. Furthermore, it is emphasized that each of the viewing angle permitted by privacy screen 266, the spin rate of rotor 244, the back light duty cycle and frequency of display screen 246 when implemented as an LCD screen, and the image refresh rate of floating image display system 100, as well as the combination of those parameters, may be predetermined so as to optimize the viewing experience of users 130a and 130B.

In some implementations, the same 2D graphic 248 may be rendered on to display screen 246 during the entirety of one or more integer numbers of rotations of rotor 244 and display screen 246 about vertical axis 254. In those implementations, each of users 130a and 130b will view floating image 118 from the same perspective, regardless of their location relative to floating image 118.

However, in other implementations, CPU 104 may execute software code 116 to use GPU 108 to modulate 2D graphic 248 as rotor 244 and display screen 246 rotate, so as to generate multiple perspectives of floating image 118 appropriate respectively to the location of each of users 130a and 130b. For example, user 130a located so as to face a front side of floating image 118 and stationary at that location would consistently view floating image 118 from a frontal perspective. By contrast, user 130b located so as to face a backside of floating image 118 and stationary at that location would consistently view floating image 118 as if from the rear.

According to some implementations, and in order to reduce the inertia of rotating display screen 246, electricity for powering display screen 246 may be provided through inductive coupling of display screen 246 to base 242.

Alternatively, rotor 244 may include multiple magnets, which may be rare earth magnets, for example, while display screen 246 may include one or more induction coils 262. In those alternative implementations, magnets 260 and one or more induction coils 262 may be operated as a generator for providing power to display screen 246 and/or computing platform 102/202 in base 242.

In some use cases, it may be advantageous or desirable to enhance the illusion that floating image 118 is floating in space independently of floating image generator 140/240. When implemented for those use cases, floating image generator 104/240 may further include masking shutter 258. Masking shutter 258 may be implemented as a liquid-crystal shutter, such as a polymer-dispersed liquid-crystal, or "smart glass" shutter, surrounding base 242, rotor 244, and display screen 246. In those implementations, masking shutter 258 may be controlled by computing platform 102/202 to remain opaque so as to obscure base 242, rotor 244, and display screen 246 while display screen 246 is spun up to generate floating image 118. Masking shutter 258 may then be controlled by computing platform 102/202 to transition from opaque to transparent to reveal floating image 118 as though spontaneously generated in space.

Alternatively, in some implementations, masking shutter 258 may include an opaque shield, in the form of a sleeve configured to slide up and down to respectively mask and unmask floating image 118. The moveable opaque sleeve may operate as an on/off switch such that, when floating image generator 140/240 is off and its elements would visible to one or more of users 130*a* and 130*b*, the opaque sleeve masks those elements.

In one implementation, one of users 130*a* and 130*b* could turn on floating image generator 240 by pulling the opaque sleeve down, activating a switch that begins rotation of rotor 244 and display screen 246. The opaque sleeve may be retarded in being pulled down by a spring underlying the opaque sleeve, resulting in a slight mechanical delay that allows rotor 244 and display screen 246 to spin up to without the user being able to see 2D graphic 248 as a stationary image.

Figure 2B:
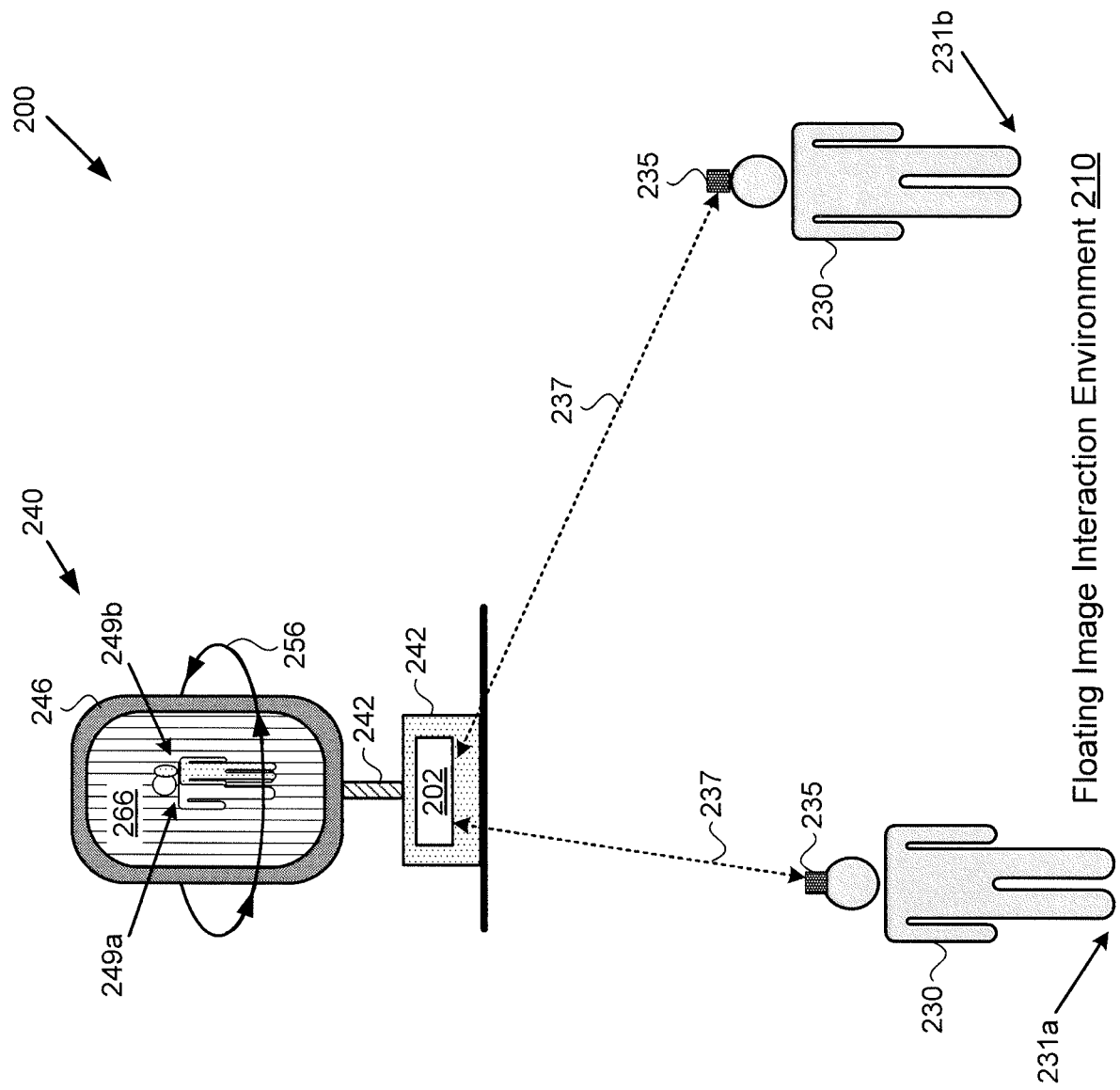
FIG. 2B shows a diagram of an exemplary floating image display system including the floating image generator of FIG. 2A, according to one to implementation.

FIG. 2B shows a diagram of exemplary floating image display system 200 including floating image generator 240, according to one implementation. It is noted that the features identified in FIG. 2B by reference numbers identical to reference numbers shown in FIG. 2A correspond respectively to those previously described features and may share any of the characteristics attributed to those corresponding features above. Also shown in FIG. 2B are locations 231*a* and 231*b* in floating image interaction environment 210, user 230, wearable floating image tracking sensor 235, and wireless communication link 237. It is further noted that 2D graphic 248, shown in FIG. 2A, is shown in FIG. 2B from two different perspectives, 249*a* and 249*b*, corresponding respectively to the perspectives user 230 has of floating image 118 from locations 231*a* and 231*b*.

Floating image display system 200 corresponds in general to floating image display system 100 in FIG. 1A, and those features may share any of the characteristics attributed to either corresponding feature by the present disclosure. Moreover, in addition to the system features described above by reference to FIG. 1A, in some implementations, as shown in FIG. 2B, floating image display system 100/200 may include one or more wearable floating image tracking sensors 235.

Wearable floating image tracking sensor 235 may be implemented as a six degree of freedom tracking sensor, for example, worn by user 230 as a head-mounted tracking sensor. Wearable floating image tracking sensor 235 is shown to be in communication with computing platform 102/202, through integrated input sensor system 120, for example, via wireless communication link 237. As user 230 moves within floating image interaction environment 110/210, for example from location 231*a* to location 231*b*, wearable floating image tracking sensor 235 enables the generation of perspectives of floating image 118 appropriate respectively to locations 231*a* and 231*b*. For example, wearable floating image tracking sensor 235 enables user 230 to view floating image 118 from perspective 249*a* when user 230 is at location 231*a*, and to advantageously view floating image 118 from location appropriate different perspective 249*b* when user is at location 231*b*.

Figure 2C:
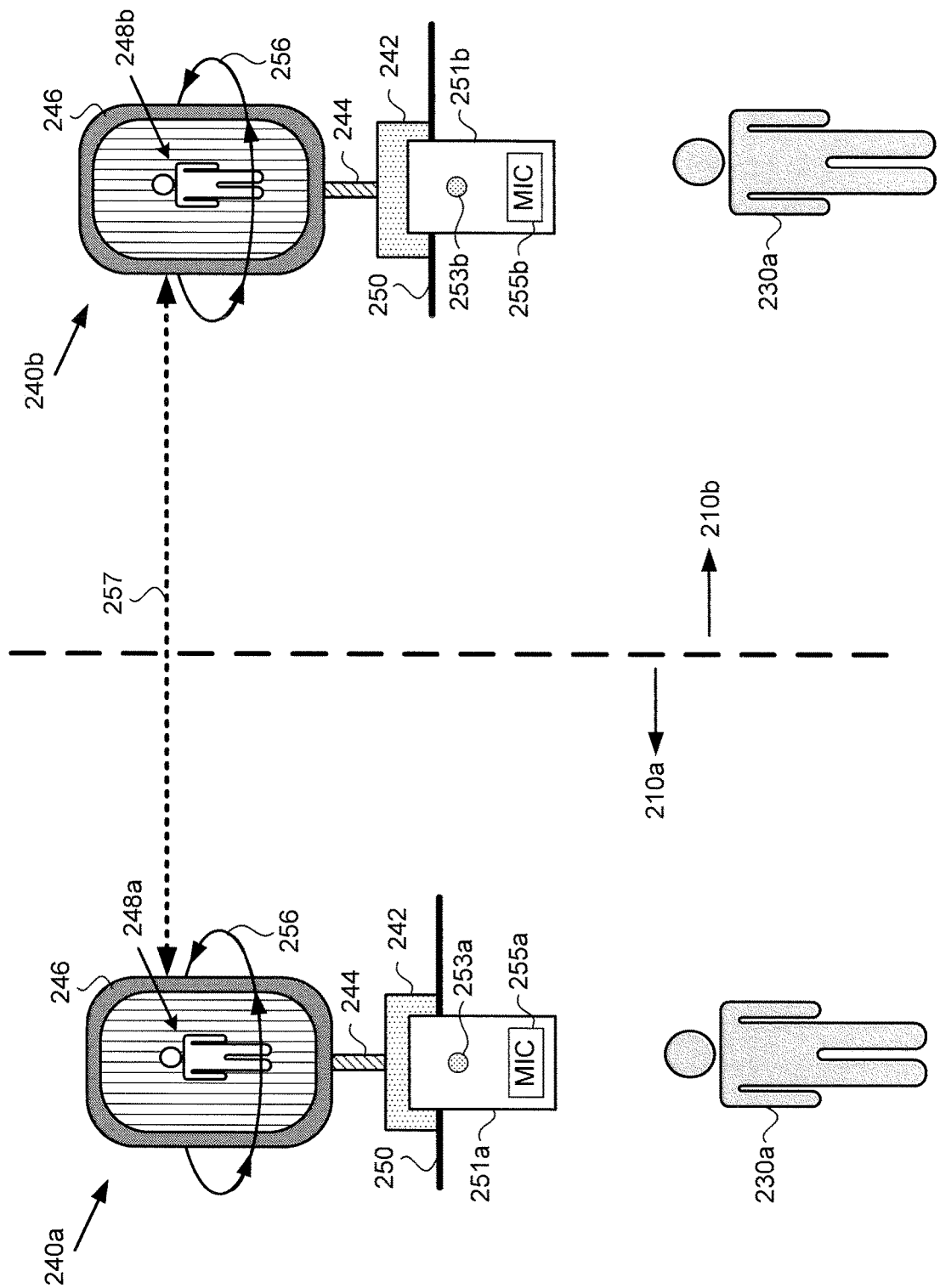
FIG. 2C shows an exemplary use case for the floating image generator of FIG. 2A, according to one implementation.

FIG. 2C shows an exemplary use case for floating image generator 240 of FIG. 2A, according to one implementation. FIG. 2C shows first floating image generator 240*a* implemented in first floating image interaction environment 210*a* utilized by user 230*a*, as well as second floating image generator 240*b* implemented in second floating image interaction environment 210*b* utilized by user 230*b* and remote from first floating image interaction environment 210*a*.

First and second floating image interaction environments 210*a* and 210*b* correspond in general to floating image interaction environment 110, in FIG. 1A, and those corresponding features may share any of the characteristics attributed to either corresponding feature by present disclosure. Moreover, it is noted that the features identified in FIG. 2C by reference numbers identical to reference numbers shown in FIG. 2A correspond respectively to those previously described features and may share any of the characteristics attributed to those corresponding features above.

Also shown in FIG. 2C are first and second smart devices 251*a* and 251*b*, which may take the form of smartphones or tablet computers, for example, and telecommunications link 257. Smart device 251*a* is shown to include video camera 253*a* and microphone 255*a*, while smart device 251*b* is shown to include video camera 253*b* and microphone 255*b*.

As noted above, in some implementations, floating image interaction environment 110/210*a*/210*b* may correspond to a teleconferencing venue in an office complex, hospital, university, or hotel business center, for example. In implementations in which floating image interaction environment 210*a*/210*b* is a teleconferencing venue, for example (hereinafter "local teleconferencing venue 210*a*" and "remote teleconferencing venue 210*b*"), user 230*a* may correspond to a local participant in a teleconference, while user 230*b* may correspond to a remote participant in the teleconference.

According to the exemplary implementation shown in FIG. 2C, video and voice data of local user 230*a* is captured by video camera 253*a* and microphone 255*a* of smart device 251*a* at local teleconferencing venue 210*a*, and is transmitted to floating image generator 140/240*b* at remote teleconferencing venue 210*b*, via telecommunications link 257. The audio data may be broadcast to remote user 230*b* by audio system 114, while 2D graphic 248*b* of local user 230*a* is rendered on display screen 246 of floating image generator 240*b*. As a result, and due to spinning of rotor 244 and display screen 246 of floating image generator 240*b*, as described above, floating image 118 appears to remote user 230*b* as a 3D interactive floating image of local user 230*a*.

Substantially concurrently, video and voice data of remote user 230*b* can be captured by video camera 253*b* and microphone 255*b* of smart device 251*b* at remote teleconferencing venue 210*b*, and may be transmitted to floating image generator 140/240*a* at local teleconferencing venue 210a, via telecommunications link 257. The audio data may be broadcast to local user 230a by audio system 114, while 2D graphic 248a of remote user 230b is rendered on display screen 246 of floating image generator 240a. As a result, and due to spinning of rotor 244 and display screen 246 of floating image generator 240a, as described above, floating image 118 appears to local user 230a as a 3D interactive floating image of remote user 230b.

FIG. 2D shows a diagram of exemplary floating image generator 240 integrated with computing platform 202, according to another implementation. It is noted that the features identified in FIG. 2D by reference numbers identical to reference numbers shown in FIG. 2A correspond respectively to those previously described features and may share any of the characteristics attributed to those corresponding features above.

Floating image generator 240 corresponds in general to floating image generator 140/240 in FIGS. 1A and 2A, and those features may share the characteristics attributed to any of the corresponding features by the present disclosure. Consequently, for example, and although not shown in FIG. 2D, floating image generator 240 may include magnets 260 and one or more induction coils 262 implemented as described above by reference to FIG. 2A.

Floating image generator 240 differs from floating image generator 240 in that floating image generator 240 includes two display screens: first display screen 246a and second display screen 246b. As shown in FIG. 2D, first and second display screens 246a and 246b are situated back-to-back and are mutually coupled to rotor 244 to spin in unison at a predetermined spin rate. In addition and as further shown by FIG. 2D, each of first and second display screens 246a and 246b has 2D graphic 248 rendered thereon. Each of first and second display screens 246a and 246b corresponds in general to display screen 246, described above, and may share any of the characteristics attributed to that corresponding feature above.

Although each of first and second display screens 246a and 246b is shown to have 2D graphic 248 rendered thereon, in some implementations, first and second display screens 246a and 246b may show different respective perspectives of 2D graphic 248. That is to say, a first perspective of 2D graphic 248 may be rendered on first display screen 246a while a second, different, perspective of 2D graphic 248 is rendered on second display screen 246b. For example, CPU 104 may execute software code 116 to use GPU 108 to render a particular perspective of 2D graphic 248 on first display screen 246a, while substantially concurrently rendering a 180° opposite perspective of 2D graphic 248 on second display screen 246b.

The exemplary back-to-back display screen implementation shown in FIG. 2D may be used to further enable the generation of multiple perspectives of floating image 118 appropriate respectively to the location of each of users 130a and 130b in floating image interaction environment 110. For example, user 130a located so as have a particular perspective of floating image 118 and stationary at that location would consistently view floating image 118 from that perspective. By contrast, user 130b located so as to have any different perspective of floating image 118 and stationary at that location would consistently view floating image 118 from that different perspective.

It is noted that the exemplary back-to-back display screen implementation shown in FIG. 2D also advantageously increases the brightness of floating image 118. It is further noted that the use of back-to-back first and second display screens 246a and 246b enables the predetermined spin rate utilized in the implementation of FIG. 2D to be approximately half that used in the implementation of FIGS. 2A, 2B, and 2C. In other words, rotor 244 and first and second display screens 246a and 246b may spin at a predetermined spin rate of approximately twenty rotations per second in the implementation shown in FIG. 2D.

FIG. 3 shows a diagram of exemplary floating image generator 340 integrated with computing platform 302, according to yet another implementation. As shown in FIG. 3, floating image generator 340 includes base 342 having integrated computing platform 302, situated on surface 350, which may be a floor within floating image interaction environment 310, or another horizontal surface within floating image interaction environment 310 substantially parallel to the floor.

In addition, floating image generator 340 includes display screen 346 having optional privacy screen 366 affixed thereon, plane mirror 368 facing display screen 346 at an angle, rotor 344 coupled to plane mirror 368, and rotor support structure 364. It is noted that in one implementation, plane mirror 368 may be angled at an is approximately 45° angle to the display surface of display screen 346.

In some implementation, as shown in FIG. 3, floating image generator 340 may further include masking shutter 358 surrounding base 342, plane mirror 368, rotor 344, rotor support structure 364, and display screen 346. Also identified in FIG. 3 are horizontal axis 352 substantially parallel to surface 350, vertical axis 354 substantially perpendicular to surface 350, spin direction 356 of rotor 344 and plane mirror 368, and 2D graphic 348 rendered on display screen 346 (2D graphic 348 not visible as such from the perspective shown by FIG. 3).

Floating image generator 340 corresponds in general to floating image generator 140, in FIG. 1A, and those features may share any of the characteristics attributed to either corresponding feature by the present disclosure. In addition, computing platform 302 corresponds in general to computing platform 102/202, in FIGS. 1A, 2A, 2B, and 2D, and those features may share the characteristics attributed to any of the corresponding features by the present disclosure. Thus, although not explicitly shown in FIG. 3, computing platform 302 includes features corresponding respectively to CPU 104, GPU 108, and system memory 106 storing software code 116. Moreover, like computing platform 102/202, computing platform 302 may be configured to control, or may have integrated therein, one or more of lighting system 112, audio system 114, and input sensor system 120.

Display screen 346, 2D graphic 348, and privacy screen 366 correspond respectively in general to display screen 246, 2D graphic 248, and privacy screen 266, in FIG. 2A, and those features may share any of the characteristics attributed to either corresponding feature by the present disclosure. Thus, although not visible from the perspective shown by FIG. 3, 2D graphic 348 rendered on display screen 346 may have an appearance similar to 2D graphic 248 in FIG. 2A.

Referring to FIGS. 1A, 2A, and 3 in combination, according to the exemplary implementation shown in FIG. 3, display screen 246/346 is controlled by GPU 108 of computing platform 102/202/302, while rotor 344 coupled to plane mirror 368 is controlled by CPU 104 of computing platform 102/202/302. CPU 104 of computing platform 102/202/302 is configured to execute software code 116 to render 2D graphic 248/348 on display screen 246/346 using GPU 108.

CPU 104 is further configured to execute software code 116 to spin rotor 344 and plane mirror 368 about vertical axis 354 perpendicular to a display surface of display screen 246/346 at a predetermined spin rate, which may be on the order of approximately one or more tens of rotations per second, such as approximately forty rotations per second for example, to generate substantially flicker free floating image 118 of 2D graphic 248/348. As a result of the floating image generation performed by floating image generator 140/340, floating image 118 appears to be a 3D floating image of 2D graphic 248/348 to users 130*a* and 130*b* viewing floating image 118.

As noted above, in some implementations, display screen 246/346 may be an LCD screen, for example. Moreover, in some implementations, display screen 246/346 may be provided by a mobile communication device included as part of floating image generator 140/340. For example, display screen 246/346 may be part of a smartphone or a tablet computer. It is noted that in implementations in which display screen 246/346 is part of a mobile communication device such as a smartphone or a tablet computer, one or more microphones 124 and sensors 122 including camera(s) 122*f* of input sensor system 120 may be features built into the mobile communication device.

In the implementation shown in FIG. 3, various features and/or techniques may be utilized to reduce flicker and/or blur of floating image 118 generated by floating image generator 140/340. For example, optional privacy screen 266/366 may be affixed to the display surface of display screen 246/346 so as to restrict viewing of display screen 246/346 outside of a predetermined viewing angle. As noted above, such a privacy screen may take the form of a louvered structure affixed to display screen 246/346, or to a privacy film covering the display surface of display screen 246/346. Alternatively, or in addition, in implementations in which display screen 246/346 is an LCD screen, CPU 104 may be configured to execute software code 116 to strobe one or more of the frequency, intensity, and duty cycle of the LCD backlight at a predetermined strobe rate.

As noted above, strobing can reduce motion blur by decreasing the time window over which the human eye and brain integrate visual information regarding spatial features. A privacy film restricts the viewing angles of display screen 246 and thereby restricts the number of spatially distinct images presented to the eye per unit of time.

In implementations in which a rotating plane mirror is utilized, rather than a rotating display, CPU 104 will execute software code 116 to cause GPU 108 to rotate rendered 2D graphic 348 synchronously with the rotation of plane mirror 368 so as to maintain floating image 118 in an upright position. Due to the rotation of 2D graphic 348, additional motion blur effects may be generated. The features and/or techniques utilized to reduce blur in the implementation of FIG. 3 may result in narrower viewing angles for the viewing of floating image 118 than is the case for the implementations shown by FIGS. 2A, 2B, 2C, and 2D.

It is noted that CPU 104 may execute software code 116 to spin rotor 344 and plane mirror 368 about vertical axis 354 at a varying spin rate, or at a substantially constant predetermined spin rate. It is also noted that spin direction 356 may be in either a counter clockwise direction with respect to the plane of horizontal axis 352, as shown in FIG. 3, or in a clockwise direction with respect to that plane. Furthermore, it is emphasized that each of the viewing angle permitted by privacy screen 266/366, the spin rate of rotor 344, the back light duty cycle and frequency of display screen 246/346 when implemented as an LCD screen, and the image refresh rate of floating image display system 100, as well as the combination of those parameters, may be predetermined so as to optimize the viewing experience of users 130*a* and 130B.

In some implementations, the same 2D graphic 248/348 may be rendered on display screen 346 during the entirety of one or more integer numbers of rotations of rotor 344 and plane mirror 368 about vertical axis 354. In those implementations, is each of users 130*a* and 130*b* will view floating image 118 from the same perspective, regardless of their location relative to floating image 118.

However, in other implementations, CPU 104 may execute software code 116 to use GPU 108 to modulate 2D graphic 248/348 as rotor 344 and plane mirror 368 rotate, so as to generate multiple perspectives of floating image 118 appropriate respectively to the location of each of users 130*a* and 130*b*. For example, user 130*a* located so as to face a front side of floating image 118 and stationary at that location would consistently view floating image 118 from a frontal perspective. By contrast, user 130*b* located so as to face a backside of floating image 118 and stationary at that location would consistently view floating image 118 as if from the rear.

As noted above, in some use cases, it may be advantageous or desirable to enhance the illusion that floating image 118 is floating in space independently of floating image generator 140/340. When implemented for those use cases, floating image generator 104/340 may further include masking shutter 358. Masking shutter 358 may be implemented as a liquid-crystal shutter, such as a polymer-dispersed liquid-crystal, or "smart glass" shutter, surrounding base 342, rotor 344, rotor support structure 364, plane mirror 368, and display screen 246/346. In those implementations, masking shutter 358 may be controlled by computing platform 102/302 to remain opaque so as to obscure base 342, rotor 344, rotor support structure 364, plane mirror 368, and display screen 246/346 while plane mirror 368 is spun up to generate floating image 118. Masking shutter 358 may then be controlled by computing platform 102/302 to transition from opaque to transparent to reveal floating image 118 as though spontaneously generated in space.

Figure 4:
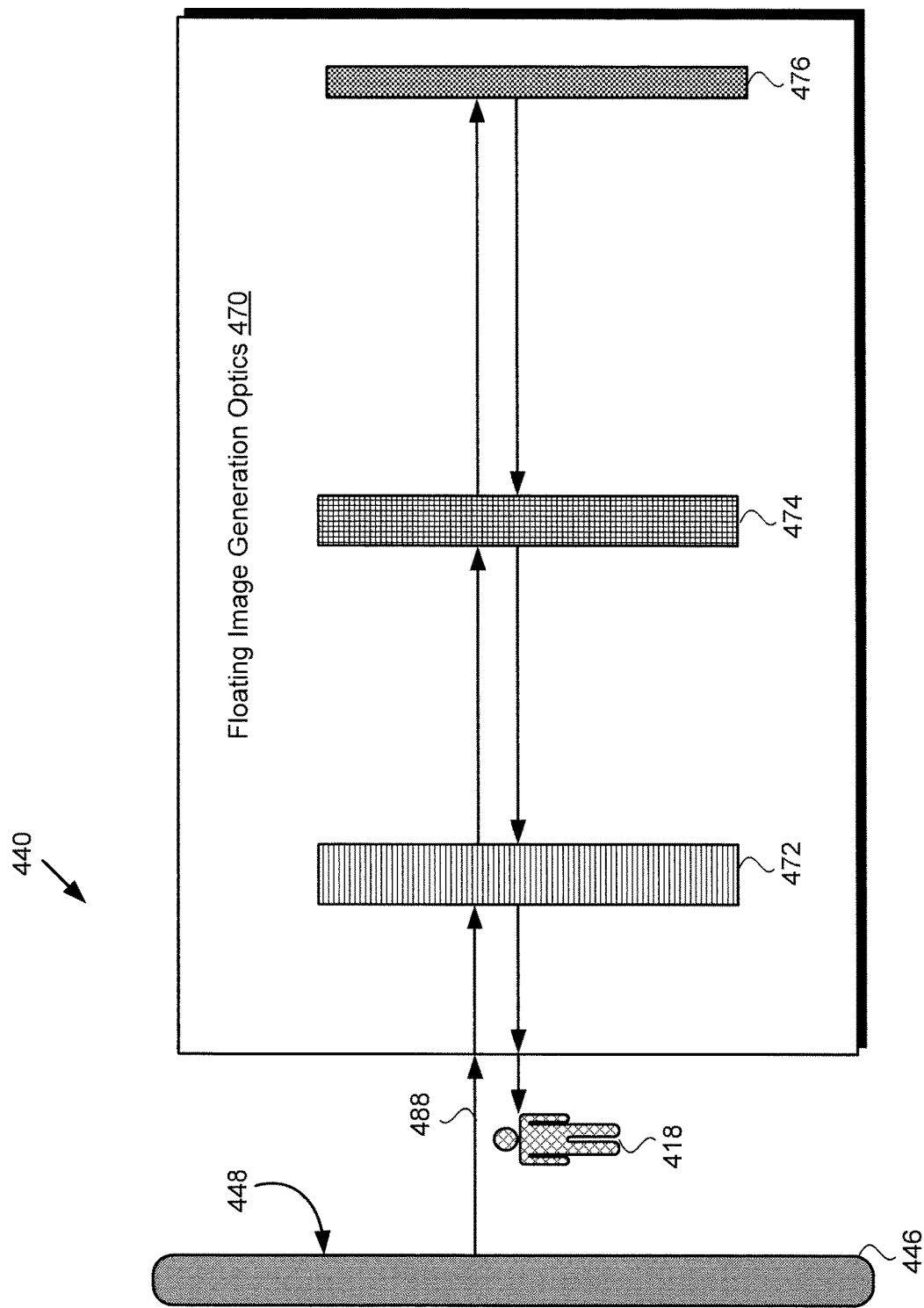
FIG. 4 shows a cross-sectional side view of an exemplary floating image generator, according to another implementation.

FIG. 4 shows a cross-sectional side view of exemplary floating image generator 440, according to another implementation. As shown in FIG. 4, floating image generator 440 includes display screen 446 having 2D graphic 448 rendered thereon (2D graphic 448 not visible as such from the perspective shown by FIG. 4). In addition, and as further shown in FIG. 4, floating image generator 440 includes floating image generation optics 470 configured to generate floating image 418 of 2D graphic 448. Also shown in FIG. 4 is light 488 emitted by display screen 446 due to 2D graphic 448 being rendered thereon.

According to the exemplary implementation shown in FIG. 4, floating image generation optics 470 includes polarizing beam splitter 472, quarter-wave plate 474, and plane mirror 476 facing display screen 446. Polarizing beam splitter 472 may be situated between display screen 446 and plane mirror 476, while quarter-wave plate 474 may be situated between polarizing beam splitter 472 and plane mirror 476.

Floating image 418 and floating image generator 440 correspond in general to floating image 118 and floating image generator 140, in FIG. 1A, and those features may share any of the characteristics attributed to either corresponding feature by the present disclosure. Moreover, display screen 446 and 2D graphic 448 correspond respectively in general to display screen 246/346 and 2D graphic 248/348, in FIGS. 2A and 3, and those features may share the characteristics attributed to any of the corresponding features by the present disclosure.

Thus, although not visible from the perspective shown by FIG. 4, 2D graphic 448 rendered on display screen 446 may have an appearance similar to 2D graphic 248 in FIG. 2A. Furthermore, although not explicitly shown in FIG. 4, display screen 246/346/446 is controlled by a computing platform corresponding to computing platform 102, in FIG. 1A, and including features corresponding respectively to CPU 104, GPU 108, and system memory 106 storing software code 116. In addition, like computing platform 102, the computing platform controlling display screen 246/346/446 may be further configured to control, or may have integrated therein, one or more of lighting system 112, audio system 114, and input sensor system 120.

According to the exemplary implementation shown in FIG. 4, 2D graphic 448 may be elliptically polarized, resulting in emission of light 488 by display screen 246/346/446 as elliptically polarized light. Light 488 emitted by display screen 246/346/446 passes through polarizing beam splitter 472, which may be configured to substantially preserve the polarization of light 488. Light 488 subsequently passes through quarter-wave plate 474 before reflecting from plane mirror 476.

In implementations in which light 488 is elliptically polarized following its passage through polarizing beam splitter 472 in the direction of quarter-wave plate 474, quarter-wave plate 474 will cause light 488 to become circularly polarized (either right or left circular polarization), and reflection from plane mirror 476 will cause light 488 to reverse the direction of its circular polarization. Reflected light 488 then once again passes through quarter-wave plate 474 and beam splitting polarizer 472, and may be emitted from floating image generation optics 470 as floating image 118/418 of 2D graphic 248/348/448. It is noted that, according to the implementation shown in FIG. 4, floating image 118/418 of 2D graphic 248/348/448 may be substantially brighter than 2D graphic 248/348/448 rendered on display screen 246/346/446, such as up to approximately three times brighter, for example.

Figure 5:
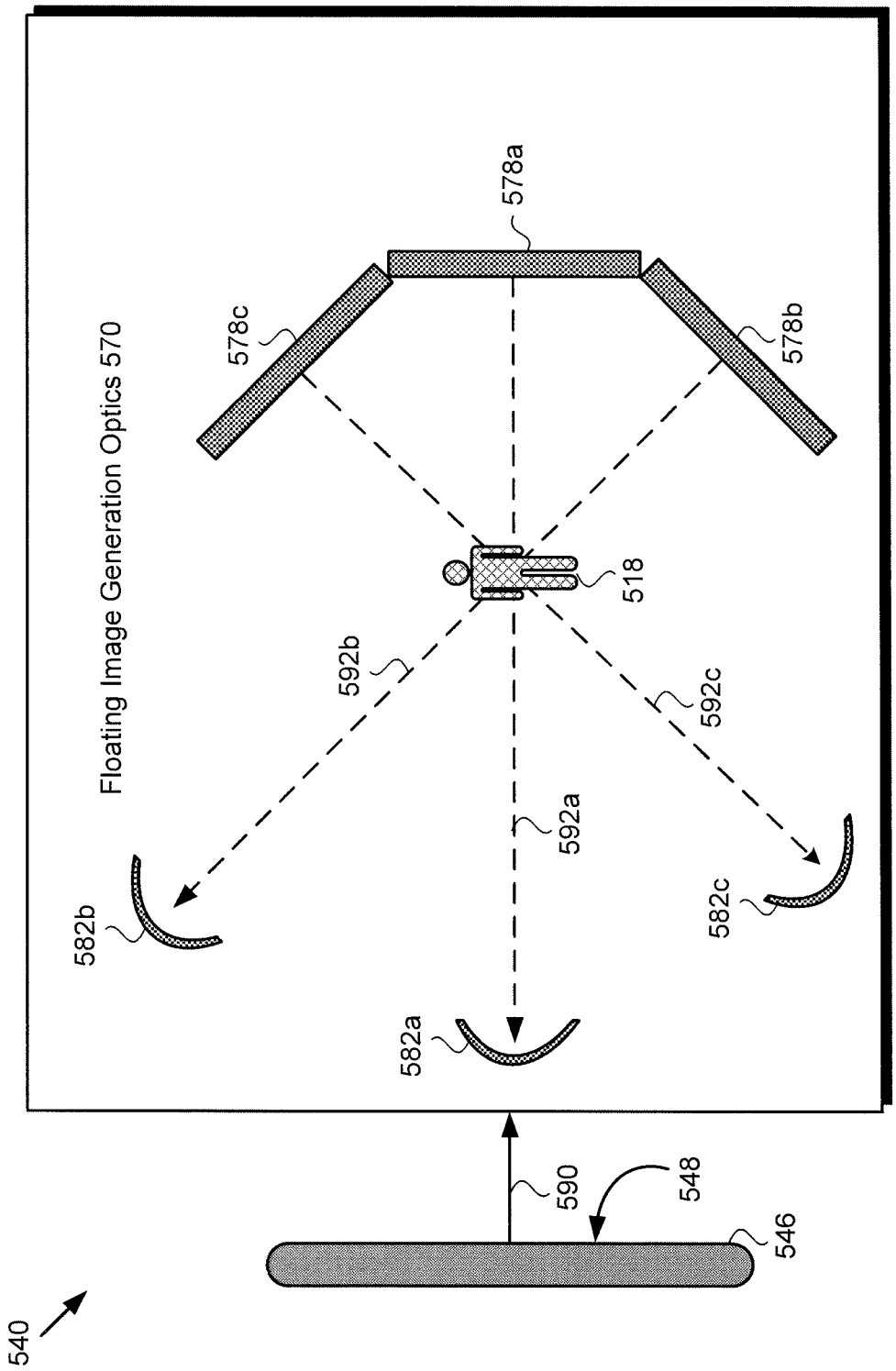
FIG. 5 shows a top view of an exemplary floating image generator, according to yet another implementation.

FIG. 5 shows a top view of exemplary floating image generator 540, according to yet another implementation. As shown in FIG. 5, floating image generator 540 includes display screen 546 having 2D graphic 548 rendered thereon (2D graphic 548 not visible as such from the perspective shown by FIG. 5). In addition, and as further shown in FIG. 5, floating image generator 540 includes floating image generation optics 570 configured to generate floating image 518 of 2D graphic 548. Also shown in FIG. 5 is light 590 emitted by display screen 546 due to 2D graphic 548 being rendered thereon.

According to the exemplary implementation shown in FIG. 5, floating image generation optics 570 includes first, second, and third plane mirrors 578a, 578b, and 548c facing display screen 546. It is noted that, in the exemplary implementation of FIG. 5, first plane mirror 578a is substantially parallel to the display surface of to display screen 546, second plane mirror 578b is angled at approximately 45° to display screen 546, and third plane mirror 578c is angled so as to be substantially perpendicular to second plane mirror 578b. In other words, third plane mirror 578c is angled at an approximately 45° angle opposite to that of second plane mirror 578b. In addition, floating image generation optics 570 includes first, second, and third concave mirrors 582a, 582b, and 582c for projecting respective images 592a, 592b, and 592c reflected by respective first, second, and third plane mirrors 578a, 578b, and 578c.

Floating image 518 and floating image generator 540 correspond in general to floating image 118 and floating image generator 140, in FIG. 1A, and those features may share any of the characteristics attributed to either corresponding feature by the present disclosure. Moreover, display screen 546 and 2D graphic 548 correspond respectively in general to display screen 246/346/446 and 2D graphic 248/348/448, in FIGS. 2A, 3, and 4, and those features may share the characteristics attributed to any corresponding feature by the present disclosure.

Thus, although not visible from the perspective shown by FIG. 5, 2D graphic 548 rendered on display screen 546 may have an appearance similar to 2D graphic 248 in FIG. 2A. Furthermore, although not explicitly shown in FIG. 5, display screen 246/346/446/546 is controlled by a computing platform corresponding to computing platform 102, in FIG. 1A, and including features corresponding respectively to CPU 104, GPU 108, and system memory 106 storing software code 116. In addition, like computing platform 102, the computing platform controlling display screen 246/346/446/546 may be further configured to control, or may have integrated therein, one or more of lighting system 112, audio system 114, and input sensor system 120.

In some implementations, first, second, and third plane mirrors 578a, 578b, and 578c may be situated so as to face display screen 246/346/446/546 from a distance of approximately one focal length. Moreover, first, second, and third concave mirrors 582a, 582b, and 582c may be situated above display screen 246/346/446/546 and may be situated apart from display screen 246/346/446/546 by a distance of approximately two focal lengths. First, second, and third plane mirrors 578a, 578b, and 578c, and first, second and third concave mirrors 582a, 582b, and 582c are configured to generate floating image 118/518 of 2D graphic 248/348/448/548. Moreover, floating image 118/518 generated by floating image generation optics 570 will appear to users 130a and 130b viewing floating image 118/518 to be shown from three discrete perspectives corresponding to images 592a, 592b, and 592c reflected by respective first, second, and third plane mirrors 578a, 578b, and 578c.

Thus, the present application discloses various implementations of a floating image display system. In some disclosed implementations, one or more display screens upon which a 2D graphic is rendered is/are spun to generate a floating image that appears to be 3D. In an alternative implementation, the 2D graphic is rendered on a display screen and a mirror facing the display screen at an angle is spun to generate the apparently 3D floating image. In yet other implementations, a relatively simple array of optical elements are utilized to project a 2D graphic as a floating to image. Consequently, the display solutions disclosed in the present application advantageously make possible and practical the display of floating images in a wide variety of use cases and implementational environments.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image display system comprising:
   a computing platform including a central processing unit (CPU), and a system memory storing a software code;
   at least one display;
   a rotor coupled to the at least one display; and
   a glass surrounding the at least one display, the glass being opaque to obscure the at least one display while the rotor is not spinning the at least one display;
   the CPU configured to execute the software code to:
      render a two-dimensional (2D) graphic on the at least one display;
      spin the rotor coupled to the at least one display, the rotor configured to spin the at least one display about a vertical axis parallel to a display surface of the at least one display at a predetermined spin rate to display a three-dimensional (3D) floating image of the 2D graphic; and
      transition the glass from opaque to transparent, after the spinning of the rotor coupled to the at least one display, to reveal the 3D floating image of the 2D graphic being rendered on the at least one display, and while the rotor is spinning the at least one display about the vertical axis using the rotor, wherein the glass remains transparent while the rotor is spinning;
      wherein the CPU is configured to transition the glass from opaque to transparent after the 2D graphic being rendered on the at least one display appears as the 3D floating image due to the spinning of the rotor coupled to the at least one display.

2. The image display system of claim 1, wherein the at least one display is viewable through the glass while transparent by viewers in a 360° circle around the image display system.

3. The image display system of claim 2, wherein the at least one display is viewable through the glass while transparent by the viewers from three perspectives being 120° apart from each other.

4. The image display system of claim 1 further comprising microphones distributed in a 360° array.

5. The image display system of claim 4, wherein the microphones rotate in synchronization with the rotor.

6. The image display system of claim 4, wherein the microphones detect a distance and a direction of sources of sounds.

7. The image display system of claim 1, wherein the CPU varies the predetermined spin rate of the rotor.

8. The image display system of claim 1 further comprising an audio speaker.

9. A method for use by an image display system including a computing platform including a central processing unit (CPU), and a system memory storing a software code, at least one display, a rotor coupled to the at least one display and a glass surrounding the at least one display, the glass being opaque to obscure the at least one display while the rotor is not spinning the at least one display, the method comprising:
   rendering, by the CPU executing the software code, a two-dimensional (2D) graphic on the at least one display;
   spinning, by the CPU executing the software code and using the rotor, the at least one display about a vertical axis parallel to a display surface of the at least one display at a predetermined spin rate to display a three-dimensional (3D) floating image of the 2D graphic; and
   transitioning, by the CPU executing the software code, the glass from opaque to transparent, after the spinning of the rotor coupled to the at least one display, to reveal the 3D floating image of the 2D graphic being rendered on the at least one display, and while the rotor is spinning the at least one display about the vertical axis using the rotor, wherein the glass remains transparent while the rotor is spinning;
   wherein the transitioning of the glass from opaque to transparent occurs after the 2D graphic being rendered on the at least one display appears as the 3D floating image due to the spinning of the rotor coupled to the at least one display.

10. The method of claim 9, wherein the at least one display is viewable through the glass while transparent by viewers in a 360° circle around the image display system.

11. The method of claim 10, wherein the at least one display is viewable through the glass while transparent by the viewers from three perspectives being 120° apart from each other.

12. The method of claim 9 further comprising:
    detecting sound using microphones of the image display system distributed in a 360° array.

13. The method of claim 12 further comprising:
    rotating the microphones in synchronization with the rotor.

14. The method of claim 12 further comprising:
    detecting, using the microphones, a distance and a direction of sources of sounds.

15. The method of claim 9 further comprising:
    varying the predetermined spin rate of the rotor.

16. The method of claim 9 further comprising:
    playing audio using an audio speaker of the image display system.

* * * * *